United States Patent [19]
Keith, Jr. et al.

[11] Patent Number: 5,291,928
[45] Date of Patent: Mar. 8, 1994

[54] PLATE JOINER

[75] Inventors: James A. Keith, Jr., Pickens; William S. Ballew, Greer, both of S.C.

[73] Assignee: Ryobi Motor Products Corp., Easley, S.C.

[21] Appl. No.: 54,640

[22] Filed: Apr. 27, 1993

[51] Int. Cl.⁵ ............................................. B27M 1/00
[52] U.S. Cl. ................................... 144/371; 30/374; 144/134 D; 144/136 C
[58] Field of Search ...................... 30/374, 377, 375; 83/875; 144/134 D, 136 C, 371; 409/178, 182

[56] References Cited

U.S. PATENT DOCUMENTS

| | | | |
|---|---|---|---|
| 2,635,655 | 4/1953 | Linstead | 144/134 D |
| 2,952,281 | 9/1960 | Weber | 144/134 D |
| 4,858,661 | 8/1989 | Bosten et al. | |
| 4,913,204 | 4/1990 | Moores et al. | |
| 4,926,916 | 5/1990 | Legler et al. | |
| 4,934,422 | 6/1990 | Hempy et al. | |
| 4,947,908 | 8/1990 | O'Banion et al. | |
| 4,971,122 | 11/1990 | Sato et al. | |

Primary Examiner—W. Donald Bray
Attorney, Agent, or Firm—Brooks and Kushman

[57] ABSTRACT

An adjustable fence for orienting a plate joiner having a body and a rotating generally planar cutter to cut an arcuate slot in a workpiece is disclosed. The fence comprises a base, a handle and a fastening mechanism. The base is shiftably affixed to the plate joiner body and has a planar surface forming a first fence oriented generally perpendicular to the plane of the cutter. The base also has a guideway parallel to the first fence. The handle is movably adjustably affixed to the base and has a grip portion adapted to cooperate with a hand of an operator and a planar surface forming a second fence forming an angle relative to the first fence. The handle cooperates with the base guideway enabling the second fence to be adjusted along a guideway axis parallel to the first fence relative to the planar cutter. The handle is pivotal about a transverse axis parallel to the first and second fences to vary the angle of the second fence relative to the first fence. The fastening mechanism selectively fastens the handle to the base in any one of a plurality of desired locations.

7 Claims, 2 Drawing Sheets

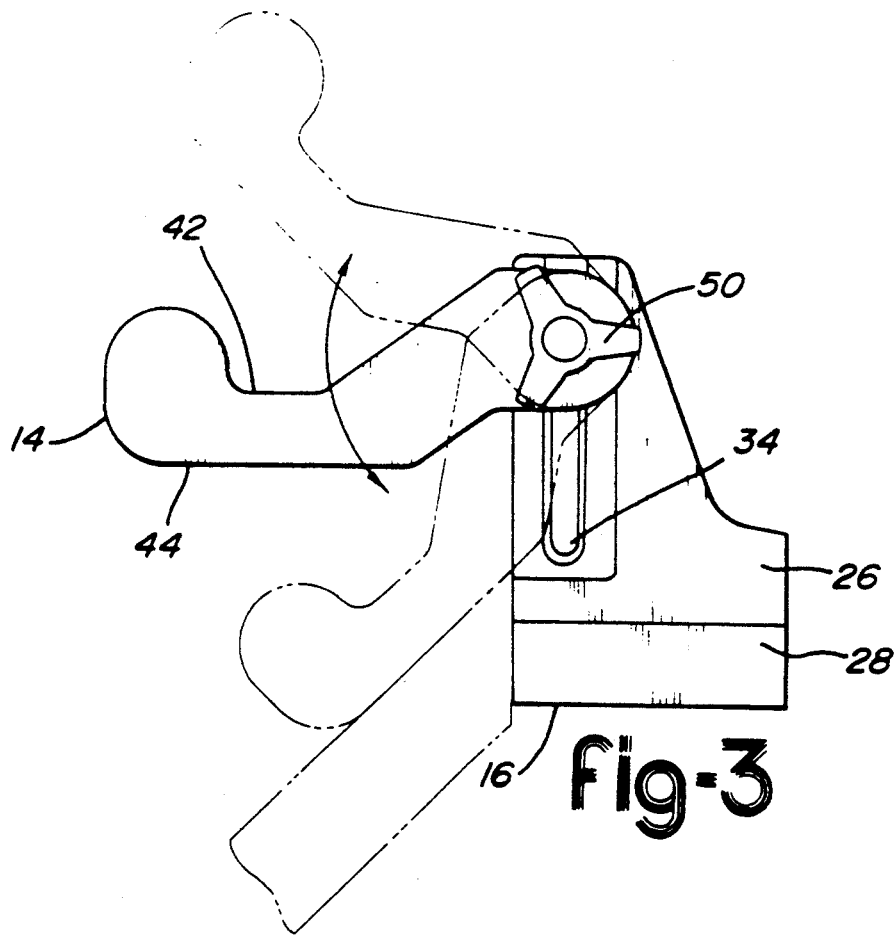
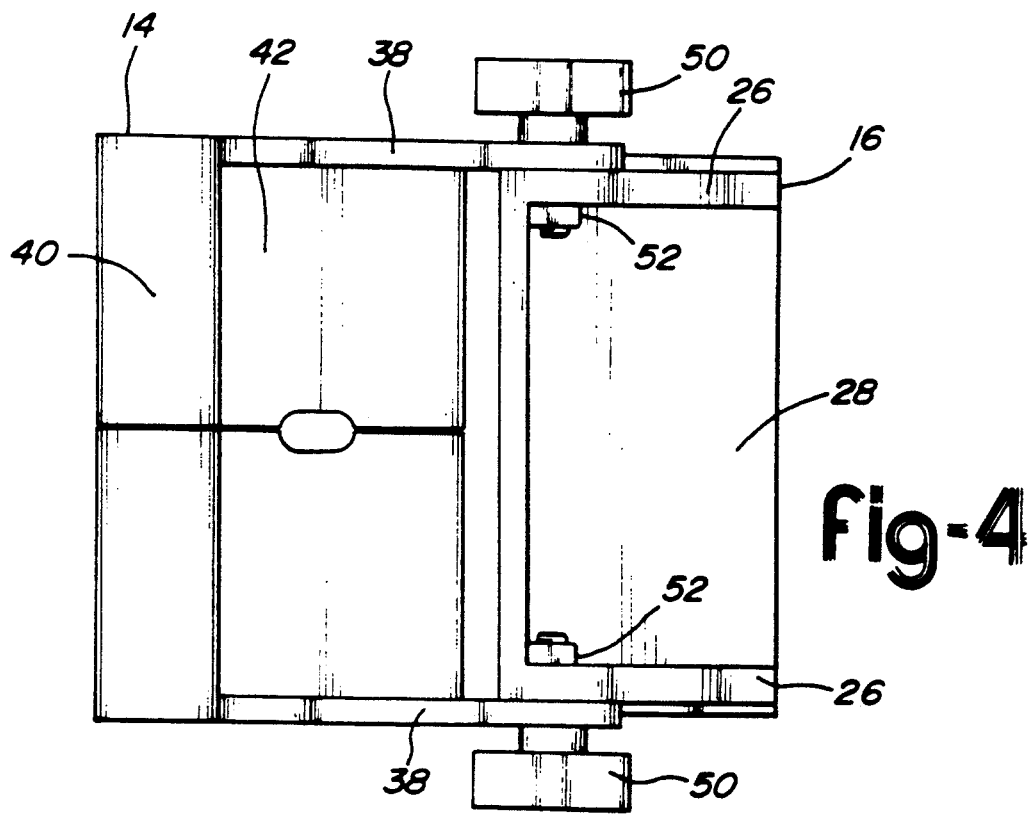

PLATE JOINER

TECHNICAL FIELD

This invention relates to plate joiners, and more particularly to an adjustable fence for a plate joiner.

BACKGROUND ART

Traditionally, manufacturers of plate joiners or biscuit joining machines have devised four distinct approaches for cutting biscuit slots. The first approach uses a horizontal-motor. An example of this approach may be seen in U.S. Pat. No. 4,971,122 to Sato et al. and U.S. Pat. No. 4,913,204 to Moores et al. The second approach is to utilize a vertical-motor such as disclosed in U.S. Pat. Nos. 4,858,661 and 4,858,662 to Bosten et al. The third approach is to utilize a joiner/spliner as disclosed in U.S. Pat. No. 4,947,908 to O'Banion et al. The last approach uses a stationary plate joiner as disclosed in U.S. Pat. No. 4,926,916 to Legler et al.

Regardless of the approach adopted, conventional plate joiners have utilized a fence adjustable in two directions. The first adjustment enables the fence to move up and down to accommodate various thicknesses of the workpiece. The second adjustment is to vary the angle of the fence for making angled cuts in the workpiece. U.S. Pat. Nos. 4,971,122 to Sato et al. and 4,913,203 to Moores et al. provide examples of plate joiners with adjustable fences movable in both directions.

In all but the stationary plate joiners, manufacturers have provided a handle to securely hold the plate joiner. Regardless of the type of handle utilized, the handles on conventional plate joiners have been fixed to the body of the plate joiner. Examples of plate joiners having a fixed handle may be seen in U.S. Pat. Nos 4,947,908 to O'Banion et al.; 4,858,661 and 4,868,662 to Bosten et al.; and 4,913,204 to Moores et al. More recently, U.S. Pat. No. 4,971,122 to Sato et al. utilized a fixed handle which forms a portion of the fence assembly.

Two important factors which should be incorporated into the manufacturing of plate joiners are the cost of the unit and its ease of use.

SUMMARY OF THE INVENTION

The object of the present invention is to provide an adjustable fence for orienting a plate joiner having a body and a cutting blade to cut a workpiece. A fence is provided having a base movably affixed to the plate joiner body. The base has a planar surface forming a first fence portion oriented generally perpendicular to the plane of the cutting blade. The base also has a guide. A handle is provided which is movably affixed to the base. The handle has a first side adapted to cooperate with a hand of an operator. The handle also has a second side with a planar surface which forms a second fence portion cooperating with the first fence portion to orient the cutting blade. The handle cooperates with the guide enabling the second fence portion to axially shift relative to the cutting blade and pivot about a transverse axis to vary the angle of the second fence portion relative the first fence portion.

A further object of the present invention is to provide a method of selectively orienting a plate joiner cutting blade on a workpiece to vary a cut made therein. Providing a base which is axially movable relative to a plate joiner body. The base has a first fence portion having a planar surface oriented generally perpendicular to the plane of the cutting blade cooperating with a first surface of the workpiece. Then positioning an axially and pivotally movable handle affixed to the base. The handle having a first side adapted for cooperation with a hand of an operator and having a second side having a planar surface forming a second fence portion cooperating with a second surface of the workpiece. Finally, fastening the handle relative to the cutting blade and the base in the desired position.

A specific object of the present invention is to provide a handle cooperating with a first fence portion on the base to form a second fence portion adjustable relative to the first fence portion for orienting a plate joiner.

A feature of the present invention is to provide a handle movable relative to a base portion to provide an adjustable fence for a plate joiner.

An advantage of the present invention is to provide a cost competitive, easily adjustable fence on a plate joiner.

The above objects, features and advantages of the present invention are readily apparent from the following detailed description of the invention when taken in connection with the accompanying drawings.

BRIEF DESCRIPTION OF THE DRAWINGS

FIG. 3 is a partial perspective view of a portion of the base and the handle showing the handle pivotally movable about the guide; and FIG. 4 is a plan view of the handle and a portion of the base showing the handle attached thereto.

DETAILED DESCRIPTION OF THE INVENTION

Figure 1:
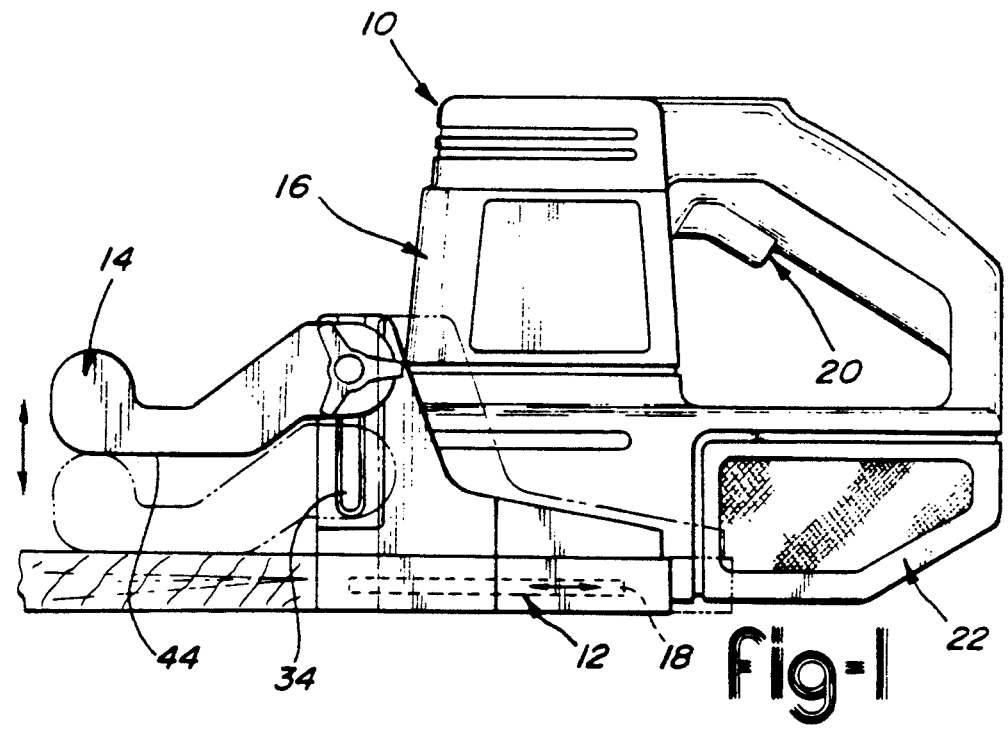
FIG. 1 is a perspective view of a plate joiner showing a handle assembly axially movable relative to the base.

The embodiment depicted in FIGS. 1-4 illustrates a plate joiner, generally indicated at 10. The major components of the plate joiner 10 shown in FIG. 1 include a base 12, a handle 14, a body 16, a cutting blade 18, a trigger mechanism 20 and a dust collector 22. For purposes of the present invention, the plate joiner 10 does not require a dust collector 22 and any form of activation means may be substituted for the trigger mechanism 20.

Figure 2:
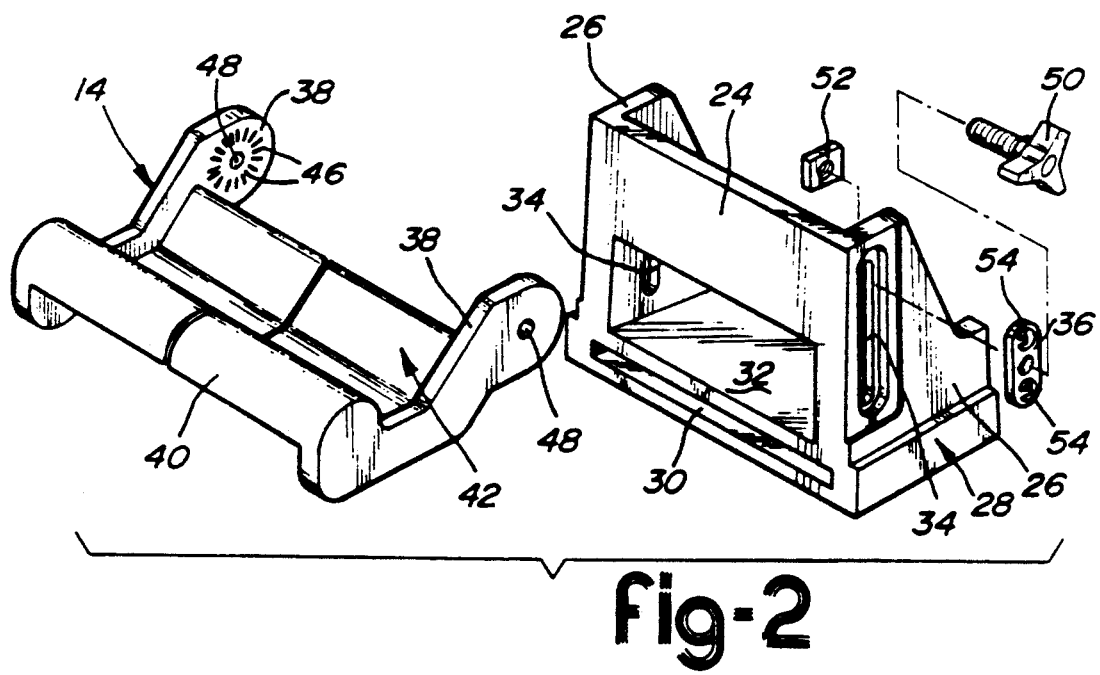
FIG. 2 is a partially exploded perspective view of the elements of the present invention.

As shown in FIG. 2, the base 12 has a first planar surface which forms a first fence 24, a pair of side surfaces 26 and a bottom section 28. A first opening 30 is provided in the first fence 24 for selectively exposing the cutting blade 18. A second opening 32 is provided in the first fence 24 to allow a portion of the body 16 to travel therethrough when the body is moved axially relative to the base 12.

An elongated slot or guide 34 is formed in each of the side surfaces 26. The guide 34 is oriented generally parallel with the first fence 24. The guide 34 is adapted to receive a detent slide 36 which is shaped to be longitudinally slidable within the guide but will not pivot. The detent slide 36 has a hole 37 centrally located therein.

Also shown in FIG. 2 is a handle 14 which is formed from a pair of wings 38 integrally connected at opposite ends of grip member 40. The handle 14 has a first side 42 which is adapted to comfortably fit the hand of an operator. To enhance this comfort, the grip member is covered with a structural foam. The handle has a second side (best shown in FIGS. 1 and 3) which has a planar surface forming a second fence 44. The second fence 44 cooperates with the first fence 24 as described below. Located on an inner surface of each of the wings 38 is an array of detents 46 arranged in a circular clock-face pattern.

Centrally located in each of the wings 38 opposite the end adjacent the grip member 40 is located a hole 48 which aligns with the guide 34 on the base 12 when the wings 38 are attached thereto. The handle 14 is movably and pivotably affixed to the base 12 by a pair of thumb screws 50 (note only one of the two thumb screws is shown in FIG. 2) which passes through the hole 48 of the wings 38, the hole of the intermediate fastener 36 and into the guide 34. The thumb screw 50 then threads into a nut 52 mounted on a side opposite the detent slide 36.

As shown in FIGS. 1 and 3, the handle 14 is axially slidable relative to the cutting blade 18 within the guide 34 and the handle is pivotable about a transverse axis of the guide 34 formed by the thumb screw 50. With the handle 14 affixed to the base 12, the thumb screws 50 may be loosened to allow the handle 14 to axially slide with the intermediate fastener 36 within the guide 34 to a desired location, at which point the thumb screw 50 may be again tightened. Alternatively, the thumb screw 50 may be further loosened to allow the handle 14 to be pivoted about the thumb screw to the desired location. This pivotal movement of the handle 14 is accomplished by cooperation of a pair of fingers 54 located on the detent slide 36 which selectively seat within detents 46 to position the handle at the desired angle. The detents 46 are an array of indentations or pockets in the surface of each of the wings 38. Alternatively, the detents can be raised male detents which would cooperate with a corresponding female attachment on the detent slide 46. The spacing between the detents 46 can be varied to correspond to different incremental changes in the angle of the second fence 44, relative to the first fence 24. In this embodiment, the detents 46 are located within the array at increments of 15°. The detents are sized such that if desired the operator may position the handle between two detents 46 for a finer adjustment. Once the desired angle has been obtained, the handle may be axially slide within the guide as previously stated to a desired location and then the thumb screw 50 is tightened to fasten the handle in the desired location. To ensure a solid connection, the detent slide 46 is constructed of steel.

The first fence 24 and the second fence 44 cooperate with each other to orient the cutting blade 18 of the plate joiner relative to the workpiece to ensure that the cut made therein is at the desired location and had the desired angle. The first fence 24 abuts a first surface of the workpiece AA and the second fence abuts a second surface of the workpiece AA to ensure the desired cut.

The external components of the plate joiner 10, including, but not limited to, the base 12, the body 16 and the handle 14 are constructed of glass filled nylon plastic which combines the characteristics of being light in weight, rigid and able to withstand being bumped or dropped.

While the best mode for carrying out the invention has been described in detail, those familiar with the art to which this invention relates will recognize alternative designs and embodiments for practicing the invention.

What is claimed is:

1. An adjustable fence for orienting a plate joiner having a body and a rotating generally planar cutter to cut an arcuate slot in a workpiece, the fence comprising:
   a base shiftably affixed to the plate joiner body, the base having a planar surface forming a first fence oriented generally perpendicular to the plane of the cutter and the base having a guideway parallel to the first fence;
   a handle movably adjustably affixed to the base, the handle having a grip portion adapted to cooperate with a hand of an operator, and a planar surface forming a second fence forming an angle relative to the first fence, the handle cooperating with the base guideway enabling the second fence to be adjusted along a guideway axis parallel to the first fence relative to the planar cutter, said handle being pivotable about a transverse axis parallel to the first and second fences to vary the angle of the second fence relative the first fence; and
   fastening means for selectively fastening the handle to the base in a desired location.

2. The fence of claim 1 wherein the guideway comprises a pair of transversely spaced apart elongated slots formed in the base.

3. The fence of claim 2 wherein the handle includes a pair of spaced apart parallel wings adapted to cooperate with the pair of slots in the base to permit limited axial and pivotal movement therebetween.

4. The fence of claim 2 wherein the fastening means includes a detent slide adapted to be slidably received within the slot, the detent slide cooperates with the detents to control pivotal movement of the handle, and a clamp adapted to be received in the slot for selectively fastening and unfastening the handle relative to the base, and the clamp adapted to be axially slidable with the handle within the guide when the clamp is unfastened.

5. The fence of claim 1 wherein the handle, the body and the base are constructed of plastic.

6. A plate joiner comprising:
   a motor for rotatably driving a planar cutter;
   activation means for selectively activating the motor;
   a body supporting the motor and the planar cutter;
   a base shiftably affixed to the body, the base having a planar surface forming a first fence oriented generally perpendicular to the plane of the cutter, and having a guideway;
   a handle movably adjustably affixed within the guideway, the handle having a grip portion adapted for cooperation with a hand of an operator and a planar surface forming a second fence forming an angle relative to the first fence, the handle cooperating with the guideway enabling the second fence to be adjusted along a guideway axis parallel to the first fence relative to the planar cutter and pivot about a transverse axis parallel to the first fence and the second fence to vary the angle of the second fence relative to the first fence; and
   fastening means for selectively fastening the handle to the base in a desired location.

7. A method of cutting an arcuate slot in a workpiece by selectively orienting a plate joiner having a planar cutter, the steps comprising:
   providing a base axially movable relative to a plate joiner body, the base having a first fence having a planar surface oriented generally perpendicular to the plane of the planar cutter to cooperate with a first surface of the workpiece;

positioning an axially and pivotally movable handle affixed to the base, the handle having a grip portion adapted for cooperation with a hand of an operator, the handle having a second side with a planar surface forming a second fence cooperating with a second surface of the workpiece; and fastening the handle to the base;

retaining the first fence and second fence securely against the workpiece having one hand of the operator gripping the handle grip;

advancing the motor and planar cutter using the operator's other hand to cut an arcuate slot in the first surface of the workpiece;

retracting the motor and planar cutter; and removing the plate joiner to expose the arcuate slot in the first surface of the workpiece.

* * * * *